J. C. NICHOLS.
STOCK FEEDING TROUGH.
APPLICATION FILED AUG. 27, 1917.
1,269,108.
Patented June 11, 1918.
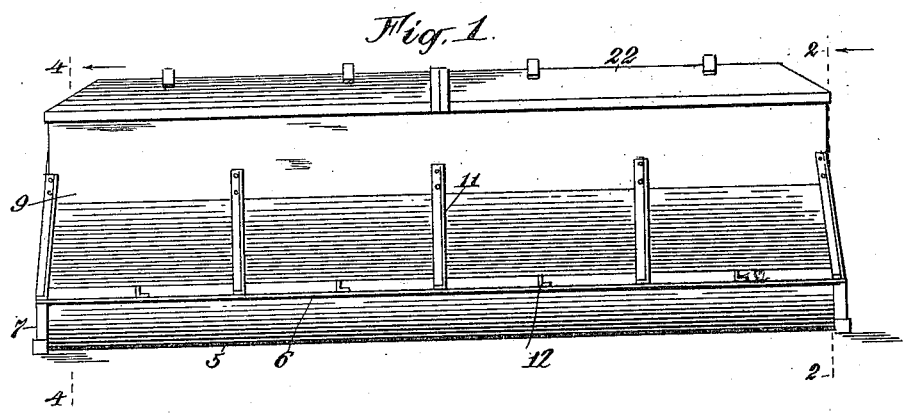
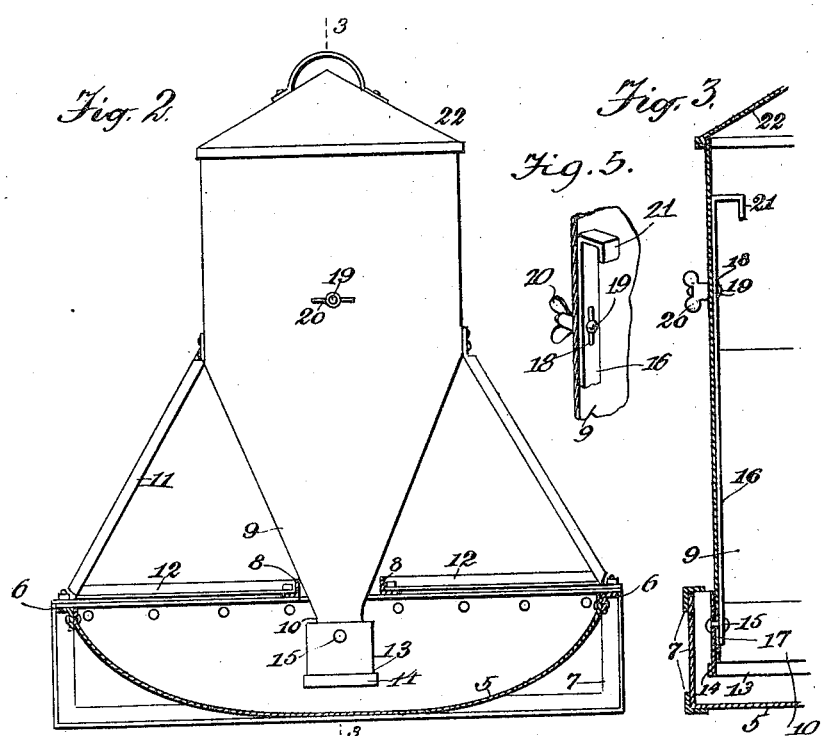
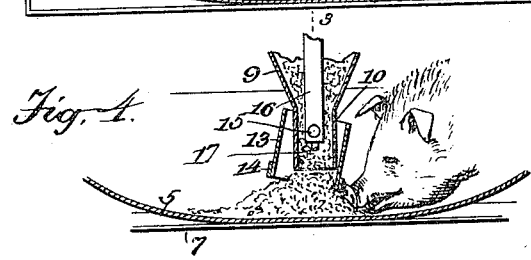
Inventor
John C. Nichols

UNITED STATES PATENT OFFICE.

JOHN C. NICHOLS, OF WEST LIBERTY, IOWA.

STOCK-FEEDING TROUGH.

1,269,108.   Specification of Letters Patent.   Patented June 11, 1918.

Application filed August 27, 1917.   Serial No. 188,330.

*To all whom it may concern:*

Be it known that I, JOHN C. NICHOLS, a citizen of the United States, residing at West Liberty, in the county of Muscatine and State of Iowa, have invented certain new and useful Improvements in Stock-Feeding Troughs; and I do hereby declare the following to be a full, clear, and exact description of the invention such as will enable others skilled in the art to which it appertains to make and use the same.

This invention relates to the feeding of hogs, calves, and other stock on a farm; and has for its object to provide a feed-trough and connected food reservoir adapted to supply feed to the trough gradually, and in quantities that may be regulated as desired.

The invention is disclosed in the description and claims following, reference being had to the accompanying drawing, in which—

Figure 1 is a side view of my improved feeder as in use. Fig. 2 is section of the same in the line 2—2, looking toward the left. Fig. 3 is a fragmentary section, taken on the line 3—3. Fig. 4 is a fragmentary section in the line 4—4, looking toward the left. Fig. 5 is a fragmentary view in perspective and partly in section, showing the upper connection of one of the supporting bars with the main hopper.

In the drawing, the numeral 5 denotes a trough formed of galvanized sheet metal, and stiffened along its sides by bars 6, which, together with the ends of the trough, are attached to end frames 7 formed of angle-bar stock, as shown. The middle portion of the trough is made nearly flat, so that the feed supplied from the hopper above may flow out sidewise, but curved upwardly and outwardly therefrom so as to be easily cleaned. Near the middle the end frames are connected at the top by parallel bars 8, separated to admit the lower end of a reservoir or feed-hopper 9. The neck 10 of this hopper, has straight, parallel sides, and serves as an outlet for the feed contained in the hopper. The hopper is supported at the proper elevation with respect to the trough, partly by these parallel bars, and partly by diagonal braces 11 extending from the sides of the hopper to the side stiffening bars of the trough. For the sake of stiffness, and to serve as separators for the feeding animals, short cross-bars 12 connect the side bars and the inner parallel bars above mentioned. If at any time it becomes necessary to remove the hopper from the trough it may be done by unbolting the braces and lifting the hopper out of place.

The flow of feed out of the throat of the hopper is regulated by a housing 13 somewhat larger than the neck of the hopper, and entirely surrounding it. This is provided with a surrounding stiffener 14, which protects it from bending and distortion by the animals while feeding. To the ends of the housing, and near the top thereof, are pivotally connected supporting bars 16, preferably inside the hopper. The pivot 15 here shown as a rivet, passes through a slot 17 in the end of the hopper neck, thus permitting vertical movement of the suspension-bar 16 and the connected housing. It is to be understood that a suspension-bar is provided for each end of the housing. Near the upper end each bar is slotted at 18, and takes a bolt 19 passing through the end of the hopper and provided with a thumb-nut 20. The upper end of the suspension-bar is suitably bent at 21 to form a handle in lifting or lowering the housing, the construction shown in Fig. 3 being duplicated at the other end.

The pivotal action of the housing is clearly shown in Fig. 4. As the snouts of the animals come in contact with the lower edge of the housing, while feeding, the housing is pushed over, which gives the feed an impulse, and causes it to flow down on the opposite side, and out into the trough. The same action by the animals on that side causes a reverse movement of the housing, and a flow of the feed to the opposite side. This continuous and alternate agitation prevents any clogging of the feed in or below the neck of the hopper, and insures a regular, but limited flow into the feed-trough. The amount of such flow is of course regulated by raising or depressing the housing, as above indicated.

A cover 22 protects the contents of the hopper from the elements.

The trough is best cleaned when the hopper is empty. The housing is then raised as high as it will go, when easy access is given to the entire feed-trough with a shovel, hoe or broom, and the contents of the trough may be scraped, washed and swept out of the trough at each upwardly curved side.

Having thus described my invention, I claim:

1. In a stock-feeder, the combination of a trough, a feed-hopper mounted over the same, and having a parallel-sided outlet, a housing of larger area surrounding said outlet, and pivotally connected with its supports, and supporting means adapted to secure said housing at any desired elevation.

2. In a stock-feeder, the combination of a trough, a feed-hopper suspended over the same, and having a parallel-sided neck forming its outlet, a surrounding housing of larger area suspended pivotally from its supports, suspending-bars, forming said supports, pivoted to the ends of the housing and through slots in the said neck, and fastening bolts near the upper ends of the suspension-bars and connecting the same with the ends of the hopper through slots which permit vertical movement, substantially as described.

3. In a stock-feeder, the combination of a trough having a flat middle portion and up-curved sides, a hopper mounted over the middle portion, and a swinging housing surrounding the outlet of the hopper, and depending below it, whereby the contents of the hopper may flow unequally under opposite sides of the housing, as the same is pushed back and forth by the feeding animals.

4. In a stock-feeder, the combination of a trough having a flat middle portion and upcurved sides, a feed-hopper mounted over the said middle portion, a swinging housing inclosing the outlet of the hopper, and vertically adjustable supports for said housing, whereby the feed may be distributed from side to side in said trough by the swing of the housing, and the housing may be shifted vertically to regulate the flow of feed and for convenience in cleaning the trough.

In testimony whereof I affix my signature in presence of two witnesses.

JOHN C. NICHOLS.

Witnesses:
ALLISON KIRBY,
E. G. JAMES.

Copies of this patent may be obtained for five cents each, by addressing the "Commissioner of Patents, Washington, D. C."